(12) United States Patent
Basic et al.

(10) Patent No.: US 8,330,403 B2
(45) Date of Patent: Dec. 11, 2012

(54) METHOD FOR DETERMINING THE POSITION OF THE FLUX VECTOR OF A MOTOR

(75) Inventors: Duro Basic, Pacy sur Eure (FR); Francois Malrait, Jouy sur Eure (FR); Pierre Rouchon, Meudon (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 362 days.

(21) Appl. No.: 12/761,907

(22) Filed: Apr. 16, 2010

(65) Prior Publication Data

US 2010/0264861 A1    Oct. 21, 2010

(30) Foreign Application Priority Data

Apr. 21, 2009  (FR) .................................... 09 52584

(51) Int. Cl.
*H02P 21/00* (2006.01)
(52) U.S. Cl. ............. 318/400.02; 318/400.33; 318/432; 318/434
(58) Field of Classification Search ............. 318/400.02, 318/400.33, 432, 434
See application file for complete search history.

(56) References Cited

U.S. PATENT DOCUMENTS

| | | |
|---|---|---|
| 2003/0006723 A1 | 1/2003 | Sul et al. |
| 2003/0062870 A1 | 4/2003 | Royak et al. |
| 2006/0119305 A1 | 6/2006 | Lee et al. |

FOREIGN PATENT DOCUMENTS

EP    1 944 860 A1    7/2008

*Primary Examiner* — Walter Benson
*Assistant Examiner* — Erick Glass
(74) *Attorney, Agent, or Firm* — Oblon, Spivak, McClelland, Maier & Neustadt, L.L.P.

(57) ABSTRACT

The invention relates to a method for determining the position of a rotor flux vector of an electric motor (M), comprising a step of injecting a first current vector into a first reference frame $(x_+, y_+)$ rotating at a first frequency $(\Omega)$ relative to a reference frame (d, q) synchronous with the rotation of the motor, and a second current vector into a second injection reference frame $(x_-, y_-)$ rotating at a second frequency opposite to the first frequency, a step of determining a first stator flux induced voltage delivered at the output of a first integrator module (12) synchronous with the first reference frame $(x_+, y_+)$ and a second stator voltage delivered at the output of a second integrator module (13) synchronous with the second reference frame $(x_-, y_-)$, a step of regulating the position of the rotor flux vector by minimizing the error $(\epsilon)$ between a real position and an estimated position $(\theta_S)$ of the rotor flux vector, the error being determined based on the second induced voltage.

8 Claims, 3 Drawing Sheets

METHOD FOR DETERMINING THE POSITION OF THE FLUX VECTOR OF A MOTOR

BACKGROUND (1) Field

The present invention relates to a method for determining the position of a flux vector of an electric motor which is driven by a variable speed drive and is designed to drive a load. The method is achieved without a speed or position sensor (sensorless), and is based on the detection of an error in the estimated position of the flux vector by using a low-frequency current injection.

(2) Description of the Related Art

To obtain an effective control of the torque of an alternating current electric motor driven by a variable speed drive, the system for controlling the drive requires information relating to the position of the flux vector of the motor (usually of the rotor). This position of the rotor flux vector can be estimated satisfactorily in a closed loop with the aid of a rotor position or speed sensor such as a coder. Nevertheless, such a sensor is relatively costly and is mechanically and electrically sensitive which may in particular cause finalization difficulties.

In the absence of the speed or position sensor, that is to say in open loop, the position of the flux vector is estimated based on modelling of the motor and of the voltage of the motor's stator. This approach is effective when the main frequency of the stator voltage, which is the image of the speed reference applied to the motor, is sufficiently high for the internal electromotive force (emf) induced by the flux to be detected reliably. This is usually the case when the main frequency of the stator voltage is higher than approximately 5-10% of the nominal frequency of the stator, that is to say when the speed applied to the motor is higher than approximately 5-10% of the nominal speed.

However, it is known that the control techniques with no position sensor based or a signal at the main frequency are not very effective at low speed because the induced electromotive force then becomes weak and can totally disappear at zero frequency. The fundamental problem is that, when the induced electromotive force depending on the speed becomes low, its evaluation based on the stator voltage becomes imprecise because of errors in the parameters of the motor model (such as the resistance of the stator). The result is that considerable angular differences are made in the evaluation of the position of flux at low speed and at heavy load, which leads to poor performance in control of the motor.

In other situations, such as the driving of a Permanent Magnet Synchronous Motor (PMSM), even if a position sensor is used, the absolute position of the rotor flux vector must be determined before the motor starts. Also necessary therefore is a method making it possible to detect the position of the rotor magnet flux at zero speed.

To provide reliable detection of the position of the rotor flux vector at low speed without using a sensor, various methods based on the injection of an auxiliary signal may be employed. Usually, the injection of a voltage or of a current into the windings of the stator at a frequency different from the main frequency is used in order to determine the positional information of the rotor flux vector by observing and by analyzing the response in current or in voltage of the stator. One method is called low-frequency harmonic current injection. The aim of this method is to generate small oscillations of torque and of rotor speed capable of inducing detectable voltage oscillations. The term "low frequency" in this context means that the injection frequency (or harmonic frequency) is in the mechanical bandwidth of the mechanical drive system. For example, for motors with a nominal frequency equal to approximately 50 Hz-60 Hz, the typical injection frequency would be of the order of 25 Hz-50 Hz.

The low-frequency current injection method is already employed for the control of an induction motor, see in particular: V.-M. Leppanen, J. Luomi, '*Speed-Sensorless Induction Machine Control for Zero Speed and Frequency*', IEEE Transactions on Industrial Electronics, Vol. 51, No. 5, October 2004, pp. 1041-1047. This method is also employed for controlling a PMSM, see in particular: S. Wu, Y. Li, X. Miao, '*Comparison of Signal Injection Methods for Sensorless control of PMSM at Very Low Speeds*', IEEE Power Electronics Specialists Conference, PESC 2007, June 2007 pp. 568-573.

This method makes it possible to determine the components of the stator voltage that are induced by the rotor flux following the controlled current injection, so as to subsequently detect the position of the rotor flux vector. For this, one approach is to use a normal PI (Proportional Integral) regulator which is synchronous with the reference frame (SRF—Synchronous Reference Frame) of the main motor current, also called reference frame (d, q) and which has sufficient bandwidth (that is to say capable of regulating the injected current also), and then to use an equation of the stator voltage to determine the inducted internal electromotive force.

However, such a method requires a knowledge of several parameters of the motor (such as the number of poles, motor inertia) and an additional demodulation process in order to determine the positional error signal of the rotor flux vector. This makes the overall algorithm complex and dependent on these parameters. Moreover, the control of the injection currents is not precise and a steady state error may appear in the regulation of these injection currents.

BRIEF SUMMARY

The object of the invention therefore is to remedy these difficulties by proposing a method for determining the position of the rotor flux vector that is simple, precise and reliable, in particular when the motor rotates at reduced speed and even at zero speed. The method does not use a position sensor and is applied to synchronous motors and to induction motors (such as asynchronous motors). In particular it allows an alignment of the control system with the initial position of the rotor of a synchronous motor and does not require particular design of the motor, such as for example the existence of saliency in a synchronous motor.

For this, the invention describes a method for determining the position of a rotor flux vector of an electric motor furnished with a stator and a rotor. The method comprises (i) a step of injecting a first current vector into a first injection reference frame rotating at a first frequency relative to a reference frame synchronous with the rotation of the motor, and a second current vector into a second injection reference frame rotating at a second frequency relative to the reference frame, the second frequency being the opposite of the first frequency, (ii) a step of determining a first stator flux induced voltage delivered at the output of a first integrator module synchronous with the first injection reference frame and a second stator flux induced voltage delivered at the output of a second integrator module synchronous with the second injection reference frame, (iii) a step of regulating the position of the rotor flux vector by minimizing the error between a real position of the rotor flux vector and an estimated position of the rotor flux vector, the error being determined based on the second stator flux induced voltage.

According to one feature, the error is determined based on the first stator flux induced voltage and on the second stator flux induced voltage.

According to a first embodiment called rotary injection, the amplitude of the second current vector is equal to zero. According to a second embodiment, called alternating injection, the amplitude of the second current vector is equal to the amplitude of the first current vector.

According to another feature, the method also comprises a step of injecting a third current vector frame into a third injection reference frame rotating at a third frequency relative to the reference frame and a fourth current vector into a fourth injection reference frame rotating at a fourth frequency relative to the reference frame, the fourth frequency being the opposite of the third frequency and the third frequency being the double of the first frequency.

The invention also relates to a variable speed drive designed to drive an electric motor of the synchronous or asynchronous type and capable of using such a determination method.

BRIEF DESCRIPTION OF THE DRAWINGS

Other features and advantages will appear in the following detailed description by referring to an embodiment given as an example and represented by the appended drawings in which.

DETAILED DESCRIPTION

A variable speed drive is usually responsible for driving an electric motor M, which comprises a stator and a rotor, by delivering an alternating-current voltage of variable frequency to the windings of the stator (PWM—Pulse Width Modulation). The object of the invention is to determine in a simple manner the position of the rotor flux vector, without using a speed or position sensor. The position of the rotor flux vector will make it possible to ascertain the position and/or the speed of the motor's rotor, thus making it possible to optimize the control of the motor. The determination method is applied in the speed drive. The electric motor may be a synchronous motor (for example a motor with permanent magnets—PMSM) or an asynchronous motor (an induction motor) and may or may not comprise saliencies.

Figure 1:
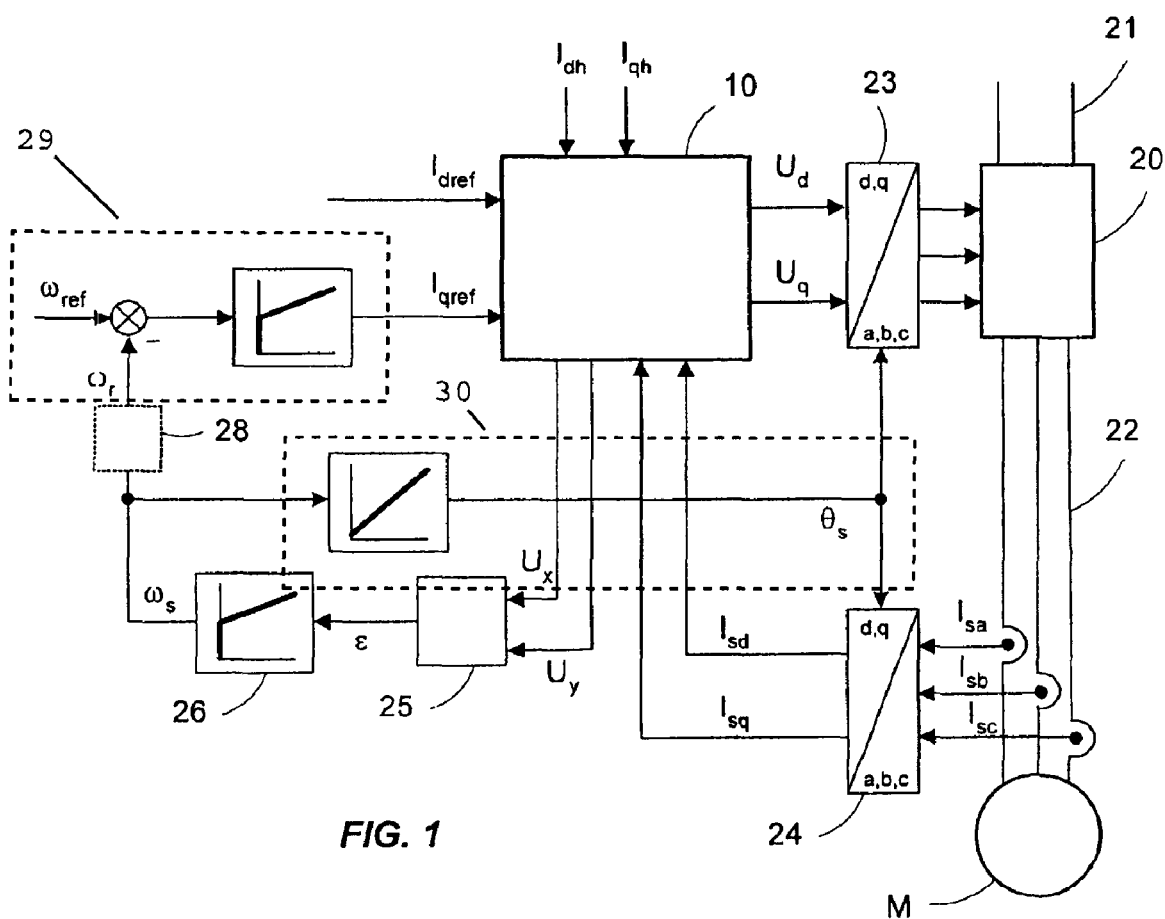
FIG. 1 shows a simplified example of the structure of a speed drive applying the invention, FIG. 2 gives details of the control module of the drive of FIG. 1, FIG. 3 gives a graphic representation of the reference frame and of the current injection reference frames.

With reference to FIG. 1, a speed drive, designed to drive a motor M, comprises an inverter module 20 responsible for transforming a direct-current voltage 21 into three-phase voltages 22 applied to the various windings of the motor's stator. Conventionally, the drive comprises a control module 10 which must control the semiconductor components of the inverter module 20 based on a voltage which consists of three components $U_a$, $U_b$, $U_c$ in a fixed three-phase reference a, b, c.

The control module 10 delivers a control voltage which consists of two components $U_d$, $U_q$ in a reference frame that is synchronous with the rotation speed of the motor. This reference frame is an orthogonal reference which is usually called a reference frame d, q—the d axis representing the rotor flux axis and the q axis representing the motor torque axis. The components $U_d$, $U_q$ in the synchronous reference frame d, q are transformed by a converter block 23 d, q->a, b, c to give the components $U_a$, $U_b$, $U_c$ in the fixed three-phase reference a, b, c making it possible to control the inverter module 20.

The reference frame d, q makes an angle called $\theta_s$ relative to a fixed reference, the angle $\theta_s$ being determined based on the estimated stator speed $\omega_s$ (see box 30 in FIG. 1). The angle $\theta_s$ corresponds to the estimated position of the rotor flux vector. To optimize the control of the motor, it is desired to minimize the error, called $\epsilon$, of angular position of the rotor flux vector so as to align the rotor flux with the axis d of the reference frame d, q. This error $\epsilon$ corresponds to the difference between the real position $\theta_R$ of the rotor flux vector and the estimated position $\theta_S$ of the rotor flux vector. This gives: $\epsilon = \theta_R - \theta_S$.

At the input, the control module 10 receives measured currents $I_{sd}$, $I_{sq}$ in the reference frame d, q. These measured currents $I_{sd}$, $I_{sd}$ originate, after transformation by a converter block 24 a, b, c->d, q, from the measurements of currents travelling in the windings of the stator according to the fixed three-phase reference a, b, c and called $I_{sa}$, $I_{sb}$, $I_{sc}$. In a known manner, at least two of the three stator current measurements $I_{sa}$, $I_{sb}$, $I_{sc}$ are necessary to the converter block 24 to obtain the measured currents $I_{sd}$, $I_{sq}$ in the reference frame d, q. In order to carry out the transformations between the fixed reference a, b, c and the reference frame d, q, the converter blocks 23, 24 use the angle $\theta_S$.

The control module 10 also receives at the input a main reference current $I_{ref}$ comprising two components $I_{dref}$, $I_{qref}$ in the reference frame d, q. The current $I_{dref}$ with the axis d corresponds to the main flux current and the current $I_{qref}$ with the axis q corresponds to the main torque current. The main reference current $I_{ref}$ makes it possible to rotate the motor M with the desired speed and torque. It is determined in particular so as to minimize the difference between a desired motor speed reference $\omega_{ref}$ and an estimated speed $\omega_r$ of rotation of the rotor obtained based on the stator speed $\omega_s$.

The method described in the invention proposes to inject an injection current $I_h$, having components $I_{dh}$ and $I_{dh}$ in the reference frame d, q, in superposition of the main currents $I_{dref}$, $I_{qref}$. For this, the method proposes to inject a first current vector according to a first injection reference frame $x_+$, $y_+$, this first reference frame $x_+$, $y_+$ rotating at a first injection frequency $\Omega$ relative to the reference frame d, q synchronous with the rotation of the motor. The method also proposes to inject a second current vector into a second injection reference frame $x_-$, $y_-$ rotating at a second injection frequency $-\Omega$ relative to the reference frame d, q.

The second injection frequency $-\Omega$ is equal to the opposite of the first frequency $\Omega$. As indicated in FIG. 3, the first injection reference frame $x_+$, $y_+$ rotating at an injection frequency $\Omega$ therefore makes an angle $\theta_h$ (see box 14 in FIG. 2) with the reference frame d, q and the second injection reference frame $x_-$, $y_-$, rotating at the opposite frequency $-\Omega$, makes an opposite angle $-\theta_h$ with the reference frame d, q.

The total stator current vector $I_{tot}$ is divided into two components $I_{dtot}$, $I_{qtot}$ in the reference frame d, q and is therefore equal to the sum of the main current $I_{ref}$ and of the injection current $I_h$. This gives: $I_{tot} = I_{ref} + I_h$ in which:

$$I_{ref} = I_{dref} + j \cdot I_{qref} \quad I_h = I_{dh} + j \cdot I_{qh} \text{ and } I_h = I_1 \cdot e^{j\Omega t} + I_2 \cdot e^{-j\Omega t}$$

The component of the injection current $I_h$ in the first injection reference frame $x_+$, $y_+$ has an amplitude $I_1$ and the component of the injection current $I_h$ in the second injection reference frame $x_-$, $y_-$ has an amplitude $I_2$. In the reference frame d, q, the components $I_{dh}$ and $I_{dh}$ of the injection current $I_h$ along the axes d and q are equal to:

$$I_{dh} = (I_1 + I_2) \cdot \cos(\Omega t) \text{ and } I_{qh} = (I_1 - I_2) \cdot \sin(\Omega t).$$

Figure 2:
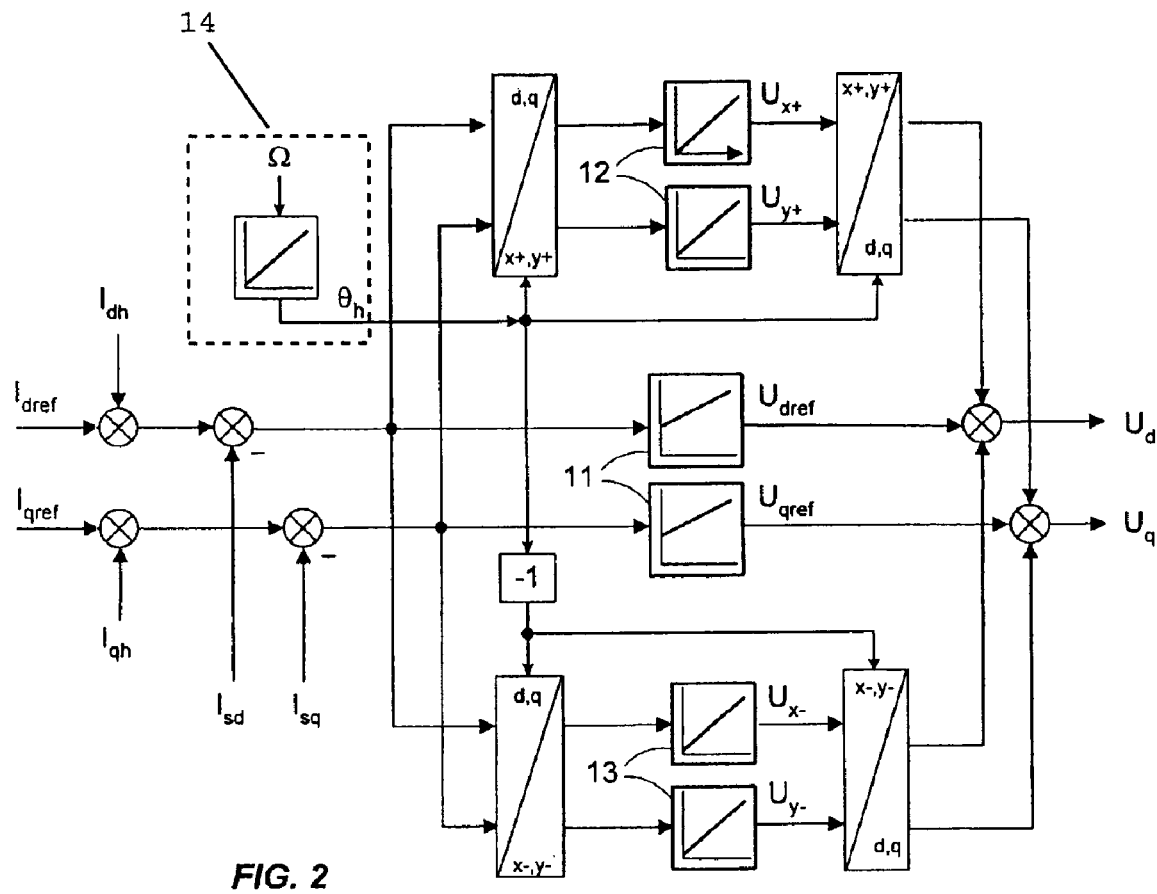
Figure 3:
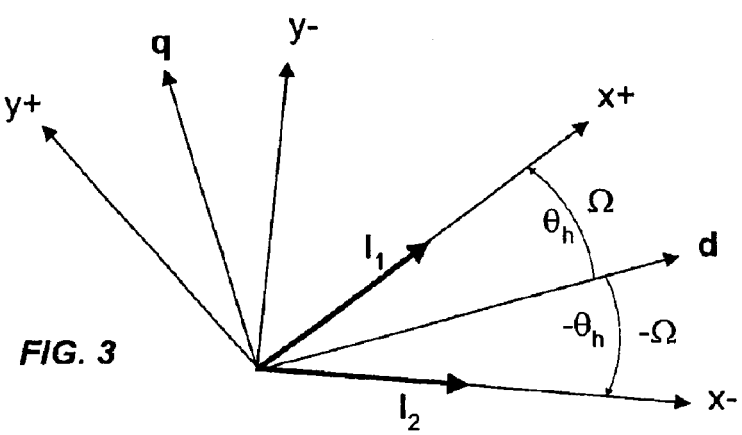

With reference to FIG. 2, the control module 10 of the drive comprises a synchronous standard PI (proportional integral) regulator module 11 in the reference frame d, q. The PI regulator module 11 in fact consists of two PI regulators which receive at the input on the one hand the difference on the d axis component between the total current $I_{dtot}$ and the measured current $I_{sd}$ and, on the other hand, the difference on the q axis component between $I_{qtot}$ and $I_{sq}$. At the output, the PI regulator 11 supplies the main voltages $U_{dref}$ and $U_{qref}$ in the reference frame d, q. This gives: $U_{ref}=U_{dref}+j*U_{qref}$ According to the invention, the control module 10 also comprises a first integrator module (integral) 12 which is synchronous with the first reference frame $x_+$, $y_+$, and a second integrator module (integral) 13 which is synchronous with the second reference frame $x_-$, $y_-$. The first integrator module 12 consists of two integrators which receive at the input on the one hand the difference on the d axis component between the total current $I_{dtot}$ and the measured current $I_{sd}$ and, on the other hand, the difference on the q axis component between $I_{dtot}$ and $I_{sd}$, after transformation in order to pass from the reference frame d, q to the first reference frame $x_+$, $y_+$ with the aid of a convertor block d, q->$x_+$, $y_+$. Similarly, the second integrator module 13 consists of two integrators which receive at the input on the one hand the difference on the d axis component between the total current $I_{dtot}$ and the measured current $I_{sd}$ and, on the other hand, the difference on the q axis component between $I_{dtot}$ and $I_{sd}$, after transformation in order to pass from the reference frame d, q to the second reference frame $x_-$, $y_-$ with the aid of a convertor block d, q->$x_-$, $y_-$.

The first integrator module 12 delivers at the output a first stator flux induced voltage $U_+$ (also called more simply the first stator voltage $U_+$) which is divided into two components $U_{x+}$ and $U_{y+}$ in the first reference frame $x_+$, $y_+$. Similarly, the second integrator module 13 delivers at the output a second stator flux induced voltage $U_-$ (or second stator voltage $U_-$) which is divided into two components $U_{x-}$ and $U_{y-}$ in the second reference frame $x_-$, $y_-$.

This gives: $U_+=U_{x+}+j*U_{y+}$ and $U_-=U_{x-}+j*U_{y-}$

The outputs of the integrator modules 12, 13 are then retransformed by the convertor blocks $x_+$, $y_+$->d, q, respectively $x_-$, $y_-$->d, q, in order to switch back to the reference frame d, q, and are then added to the main voltages $U_{dref}$ and $U_{qref}$ in order to supply the two components $U_d$, $U_q$ of the control voltage to be applied to the motor M.

It is found that the first stator flux induced voltage $U_+$ and the second stator flux induced voltage $U_-$ are functions of the error $\epsilon$ of angular position of the rotor flux vector, that is to say of the difference between the real position $\theta_R$ of the rotor flux vector and the estimated position $\theta_S$ of the rotor flux vector, which is equal to the position of the reference frame d, q. Therefore, the detection of these voltages $U_+$ and $U_-$ will make it possible to minimize the error $\epsilon$ and therefore to determine with precision the real position of the rotor flux vector.

1) The Case of a Synchronous Motor M

In a first embodiment, the current is injected with an amplitude $I_1$ of the component in the reference frame $x_+$, $y_+$ which is equal to I and an amplitude $I_2$ of the component in the reference frame $x_-$, $y_-$ which is equal to zero. This mode is called harmonic current rotary injection. A current is therefore injected only by means of a current vector rotating at a positive injection frequency $\Omega$. The current injection at a negative frequency is regulated to zero.

This then gives: $I_h=I*e^{j\Omega t}=I*\cos(\Omega t)+j*I*\sin(\Omega t)=I_{dh}+j*I_{qh}$.

In this first mode, the real portion $U_{x-}$ (that is to say the x-axis component) of the second stator flux induced voltage $U_-$ is proportional to the error $\epsilon$, according to the following formula:

$$U_{x-} = \text{Re}(U_-) = \left(\Delta L(\Omega - 2\bar{\omega}) + \frac{3n_p^2}{4J\Omega}\bar{\varphi}_m^2\right)I\sin(2\varepsilon)$$

In which: $\Delta L$ represents the saliency inductance of which the value depends on the difference between the inductances $L_d$ and $L_q$ of the d and q axes of the motor M $n_p$ represents the number of poles of the motor, $\phi_m$ represents the amplitude of the magnetic flux of the rotor, $\bar{\omega}$ represents the mean speed of the rotor, J represents the inertia of the motor.

It is noted that the signal $U_{x-}$ exists even in the absence of saliency, that is to say even when $\Delta L=0$. The proposed method therefore operates even in the absence of saliency in the motor M. In the first embodiment, the error $\epsilon$ can be determined based on two components $U_{x-}$ and $U_{y-}$ of the second stator flux induced voltage $U_-$, according to the formula:

$$\varepsilon = \frac{U_{x-}}{\sqrt{U_{x-}^2 + U_{y-}^2}}$$

In a second embodiment, current injection is realized with amplitude $I_1$ of the component in the reference frame $x_+$, $y_+$ which is equal to the amplitude $I_2$ of the component in the reference frame $x_-$, $y_-$, that is $I_1=I_2=I/2$. This embodiment is called harmonic current alternating injection. This case corresponds to the application of two components of the injected current $I_{dh}$ and $I_{qh}$, with the amplitude $I_{qh}$ equal to 0.

$I_h=I/2e^{j\Omega t}+I/2e^{-j\Omega t}=I*\cos(\Omega t)+j*0=I_{dh}+j*I_{qh}$.

This embodiment is therefore equivalent to the application of an alternating current of frequency $\Omega$ only on the d axis (see FIG. 3). The resultant stator flux induced voltage $U_\Sigma$ is equal to:

$U_\Sigma=(U_- - U_+)/2=U_{\Sigma x}j*U_{\Sigma y}=(U_{x-}-U_{x+})/2j*(U_{y-}-U_{y+})/2$ In this second mode, the real portion of the second resultant stator flux induced voltage $U_\Sigma$ is proportional to the error $\epsilon$, according to the following formula:

$$U_{\Sigma x} = \text{Re}(U_\Sigma)$$

$$= \left(\Omega\Delta L + \frac{3n_p^2}{4J\Omega}|\bar{\varphi}_m|^2\right)I\sin(2\varepsilon) + \frac{3n_p^2}{16J\Omega}\Delta L^2 I^3\sin(4\varepsilon)$$

An advantage of the second embodiment is that, when the rotor flux and the reference frame of the motor are aligned, the injection of current does not cause speed and torque oscillations (no variation of $\omega$). This type of injection is therefore very favourable for use in a sensorless motor control.

In the second embodiment, the error E can be determined based on two components $U_{\Sigma x}$ and $U_{\Sigma y}$ of the resultant stator flux induced voltage $U_\Sigma$, according to the formula:

$$\varepsilon = \frac{U_{\Sigma x}}{\sqrt{U_{\Sigma x}^2 + U_{\Sigma y}^2}}$$

Therefore, according to the invention, the error ϵ is determined simply by a first calculation block 25, directly based on the outputs of the integrator modules 12 and/or 13. In the first embodiment, the error ϵ is determined based on the second stator flux voltage U_ delivered at the output of the second integrator module 13 synchronous with the second reference frame x_, y_. In the second embodiment, the error ϵ is determined based on the first stator flux voltage U_+ delivered at the output of the first integrator module 12 synchronous with the first reference frame x_+, y_+ and on the second stator flux voltage U_ delivered at the output of the second integrator module 13 synchronous with the second reference frame x_, y_. For the purposes of simplification, FIG. 1 represents the calculation block 25 with inputs marked U_+ and U_, irrespective of the embodiment.

The error ϵ calculated by the block 25 is then used to determine the stator speed $\omega_S$, with the aid of a second calculating module 26 which comprises for example a PI regulator of the PLL (Phase Locked Loop) type. For a synchronous motor, it happens that the speed of the motor corresponds to the speed of the reference frame d, q.

$$\omega_s(s) = -\left(K_{p\varepsilon} + \frac{K_{i\varepsilon}}{s}\right)\varepsilon(s)$$

Other known calculation methods can also be envisaged to obtain the stator speed $\omega_s$, based on the error ϵ, by using for example observer techniques.

In the case of a synchronous motor, the stator speed $\omega_s$ directly gives the estimated speed $\omega_r$ of rotation of the rotor. In the case of the asynchronous motor, an additional calculation block 28 (see FIG. 1) makes it possible to take account of the slippage of the motor in order to determine the estimated speed $\omega_r$ of the rotor based on the stator speed $\omega_s$. In both cases, this estimated speed $\omega_r$ of the rotor is then subtracted from the speed reference $\omega_{ref}$ in order to calculate the main torque current $I_{qref}$ (see box 29 in FIG. 1).

Moreover, by integrating the stator speed $\omega_s$, the angle $\theta_s$ is obtained representing the position of the reference frame d, q. The angle $\theta_s$ is therefore determined based on the outputs of the integrator modules 12 and/or 13. Advantageously, the calculated value of the angle $\theta_S$ of the reference frame d, q is looped back and is used in the convertor blocks 23 and 24 in order to adjust and regulate in the best way possible the angle between the reference frame d, q and the fixed reference.

Therefore, by virtue of this regulation loop, the angle of rotation of the reference frame d, q relative to the three-phase fixed reference a, b, c is permanently and simply optimized, which in particular makes it possible to refine the measured currents $I_{sd}$, $I_{sd}$. This regulation step therefore makes it possible to minimize the error E of angular position of the rotor flux vector and make it tend towards zero, that is to say to obtain an estimated position $\theta_S$ of the rotor flux vector that is equal to the real position $\theta_R$ of the rotor flux vector.

In the equations shown above, it is noted that the stator flux induced voltages are functions of 2ϵ. This means that, for a PMSM comprising a magnetized rotor, it is only possible to detect the position of the magnetic flux of the rotor, but not its orientation or its polarity (0-π ambiguity). However, if the motor M has saliencies, it is still possible to detect the orientation of the magnetic flux by using the enhancement of the determination method illustrated in FIG. 4.

Figure 4:
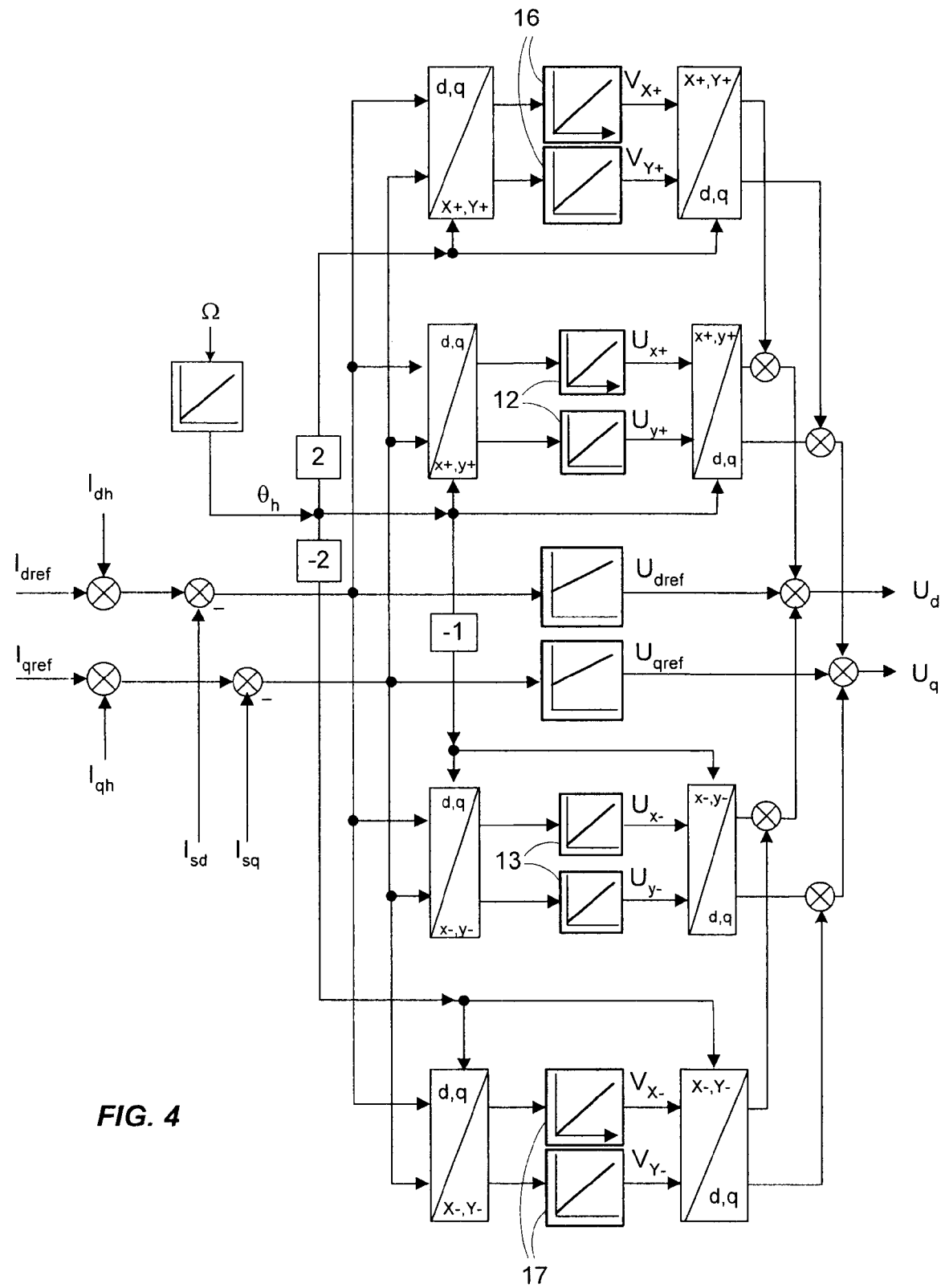
FIG. 4 shows an enhancement of FIG. 2.

With reference to FIG. 4, current is injected not only with a first and a second injection frequency equal respectively to Ω and −Ω, but also with a third and a fourth injection frequency equal respectively to double the first frequency Ω and the second frequency −Ω.

The method therefore also proposes to inject a third current vector according to a third current injection reference frame X_+, Y_+, this third reference frame X_+, Y_+ rotating at the injection frequency 2Ω relative to the reference frame d, q and a fourth current vector into a fourth current injection reference frame X−, Y−rotating at the injection frequency −2Ω relative to the reference frame d, q. The third current vector is of amplitude I1 and the fourth current vector is of amplitude I2. The control module 10 also comprises a third integrator module (integral) 16 which is synchronous with the third reference frame X_+, Y_+, and a fourth integrator module (integral) 17 which is synchronous with the fourth reference frame X_, Y_, each integrator module 16, 17 consisting of two integrators, as indicated in FIG. 4.

The third integrator module 16 delivers at the output a third stator flux induced voltage V_+ which is divided into two components $V_{X+}$ and $V_{Y+}$ in the third reference frame X_+, Y_+. Similarly, the fourth integrator module 16 delivers at the output a fourth stator flux induced voltage V_ which is divided into two components $V_{X-}$ and $V_{Y-}$ in the fourth reference frame x_, Y_.

This gives: $V_+=V_{X+}+j*V_{Y+}$ and $V_-=V_{X-}+j*V_{Y-}$.

The outputs of the integrator modules 16, 17 are then retransformed in order to switch back to the reference frame d, q, and are then added to the main voltages $U_{dref}$ and $U_{qref}$ in order to supply the two components $U_d$, $U_q$ of the control voltage to be applied to the motor M. It happens that the real portion of the induced voltage V_+ is a direct function of the error ϵ, according to the formula:

$$V_{X+} = -\left(\frac{3n_p^2}{2J\Omega}\bar{\varphi}_m \frac{\Delta L l^2}{4}\right)\sin(\varepsilon)$$

Therefore, by analyzing the sign of the component $V_{X+}$ of the third stator flux induced voltage V_+, it is possible to easily determine the sign of sin(ϵ) and therefore the orientation of the magnetic flux of the rotor.

2) The Case of Induction Motor M

Advantageously, the determination method described in the invention can also be achieved with an induction motor, for example an asynchronous motor. Specifically, in the case of an induction motor, the first stator flux induced voltage U_+ and the second stator flux induced voltage U_ are also a function of the error ϵ of angular position of the rotor flux vector. The two embodiments described above can therefore be used with an induction motor.

In a first embodiment similar to that previously described, current is injected with an amplitude I_1 of the component in the reference frame x_+, y_+ which is equal to I and an amplitude I_2 of the component in the reference frame x_, y_ which is equal to zero. Current is injected therefore only by means of a current vector rotating at a positive injection frequency Ω. The current injection at a negative frequency is regulated to zero. This then gives: $I_h=I*e^{j\Omega t}=I*\cos(\Omega t)+j*I*\sin(\Omega t)$.

In this first embodiment, the real portion $U_{X-}$ of the second stator flux induced voltage U_ is proportional to the error ϵ, according to the following formula:

$$U_{x-} = \text{Re}(U_-) = \frac{3n_p^2 I}{4J\Omega}|\bar{\varphi}_r|^2\left[\left(1 - \frac{\bar{\omega}}{\Omega}\right)\sin(2\varepsilon) - \frac{\tau_r^{-1}}{\Omega}\cos(2\varepsilon)\right]$$

in which $n_p$ represents the number of poles of the motor, $\varphi_r$, represents the amplitude of the magnetic flux of the rotor, $\bar{\omega}$ represents the mean speed of the rotor, J represents the inertia of the motor, $\tau_r$ represents a time constant of the rotor.

In a second embodiment similar to that described above, current is injected with the amplitude $I_1$ of the component in the reference frame $x_+$, $y_+$ which is equal to the amplitude $I_2$ of the component in the reference frame $x_-$, $y_-$, that is to say $I_1=I_2=I/2$. This case corresponds to the application of two components of the injected current $I_{dh}$ and $I_{qh}$, with the amplitude $I_{qh}$ equal to 0. This then gives: $I_h=\frac{1}{2}*e^{j\Omega t}+\frac{1}{2}*e^{-j\Omega t}=I*\cos(\Omega t)$.

In this second embodiment, the real portion of the second resultant stator flux induced voltage $U_\Sigma$ is proportional to the error $\varepsilon$ according to the following formula:

$$U_{\Sigma x} = \text{Re}(U_\Sigma) = -\frac{3n_p^2 I}{4J\Omega}|\bar{\varphi}_r|^2\sin(2\varepsilon) + \frac{\bar{\omega}}{\Omega}R_r I$$

in which $n_p$ represents the number of poles of the motor, $\varphi_r$ represents the amplitude of the magnetic flux of the rotor, Rr represents the equivalent resistance of the resistance of the rotor, $\bar{\omega}$ represents the mean speed of the rotor, J represents the inertia of the motor.

It is noted that the above equation comprises an offset term $$\frac{\bar{\omega}}{\Omega}R_r I$$

which is a fixed value that does not depend on $\varepsilon$. The effect of this offset is however attenuated and can be neglected if the injection frequency $\Omega$ is selected at a sufficiently high value (for example 30 Hz) relative to the mean speed $\bar{\omega}$ of the rotor. This condition is fulfilled since the invention is particularly suited for a determination of the position of the rotor rotating at a reduced speed (for example <5 Hz).

The invention claimed is:

1. A method for determining the position of a rotor flux vector of an electric motor comprising a stator and a rotor, the method comprising:
   a step of injecting a first current vector into a first injection reference frame rotating at a first frequency relative to a reference frame synchronous with the rotation of the motor, and a second current vector into a second injection reference frame rotating at a second frequency relative to the reference frame, the second frequency being the opposite of the first frequency,
   a step of determining a first stator flux induced voltage delivered at the output of a first integrator module synchronous with the first injection reference frame and a second stator flux induced voltage delivered at the output of a second integrator module synchronous with the second injection reference frame,
   a step of regulating a position of a rotor flux vector by minimizing an error between a real position of the rotor flux vector and an estimated position of the rotor flux vector, the error being determined based on the second stator flux induced voltage.

2. The method according to claim 1, wherein the error is determined based on the first stator flux induced voltage and on the second stator flux induced voltage.

3. The method according to claim 2, wherein an amplitude of the second current vector is equal to an amplitude of the first current vector.

4. The method according to claim 1, wherein an amplitude of the second current vector is equal to zero.

5. The method according to one of claims 1 to 4, wherein the electric motor is an induction motor.

6. The method according to one of claims 1 to 4, wherein the electric motor is a synchronous motor.

7. The method according to claim 6, wherein the method comprises a step of injecting a third current vector into a third injection reference frame rotating at a third frequency relative to the reference frame and a fourth current vector into a fourth injection reference frame rotating at a fourth frequency relative to the reference frame, the fourth frequency being the opposite of the third frequency and the third frequency being the double of the first frequency.

8. A variable speed drive designed to drive an electric motor, wherein the variable speed drive uses a determination method according to claims 1, 2, 3, or 4.

* * * * *